No. 860,417.  
PATENTED JULY 16, 1907.
H. W. SPEIGHT.  
HAT STUD.  
APPLICATION FILED MAY 1, 1907.
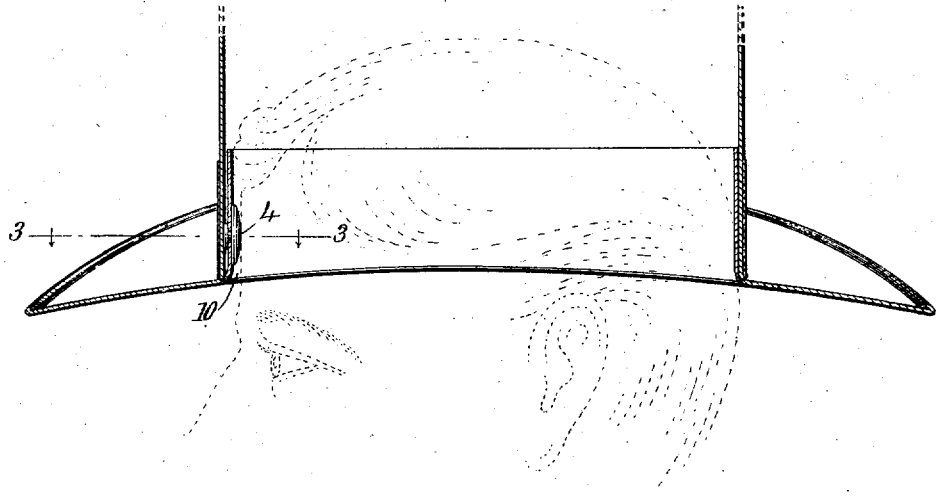
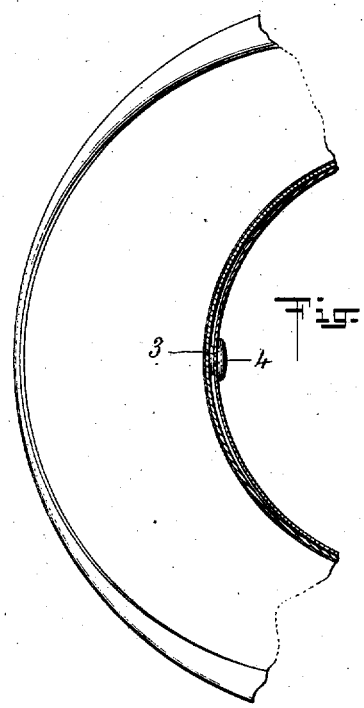
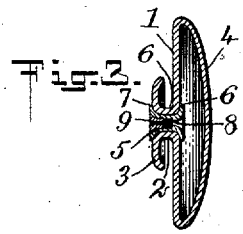
WITNESSES
INVENTOR  
Henry W. Speight  
BY Munn & Co.  
ATTORNEYS

UNITED STATES PATENT OFFICE.

HENRY W. SPEIGHT, OF NEW YORK, N. Y.

HAT-STUD.

No. 860,417.　　　Specification of Letters Patent.　　　Patented July 16, 1907.

Application filed May 1, 1907. Serial No. 371,291.

*To all whom it may concern:*

Be it known that I, HENRY W. SPEIGHT, a citizen of the United States, and a resident of the city of New York, (borough of Brooklyn,) in the county of Kings and State of New York, have invented a new and Improved Hat-Stud, of which the following is a full, clear, and exact description.

This invention has for its object to provide means simple in construction, effective in operation and comfortable in use, adapted to space the sweat band of a hat from the forehead of a user, and thereby ventilate the interior of the hat.

Other objects relating to the specific construction and special arrangement of the parts will be understood from the accompanying drawings and following description, in which drawings like characters of reference indicate like parts throughout the views, and in which Figure 1 is a side elevation of a device embodying my invention applied to the sweat band of a hat; Fig. 2 is a plan of the device shown in Fig. 1 with the crown of the hat shown in horizontal section; and Fig. 3 is a horizontal section of said device taken on the line 3—3 of Fig. 1.

As illustrated in the drawings, a stud, constructed of yielding material, preferably rubber, is provided with a back 1, having a shank 2 and a flange 3 formed integrally therewith. A concavo-convex face 4 is formed with or attached to the back of the stud. The back of the stud is preferably provided with a metallic eyelet 5 having off-set ends 6 and 7 adapted to hold the eyelet against longitudinal displacement in the shank of the stud. The stud 5 is provided with a bore adapted to receive a perforated rubber washer 8 which is held in the bore of the shank of the stud by means of a stud screw 9 having a threaded engagement with the sleeve 5, so that the rubber washer may be compressed by the screw thread and close the aperture of said sleeve.

The device when in use is inflated with air or otherwise, and the aperture of the threaded stud 9 closed so as to prevent the body of the stud from collapsing. The stud when so inflated is applied to the sweat band of a hat, the shank 2 of the stud engaging a corresponding aperture in the sweat band and the flange 3 holding the stud in place and arranged between the inner side of the sweat band and crown of the hat. The body of the stud being of a yielding nature readily conforms to the shape of the forehead of the user, and while resting comfortably on the forehead spaces the front of the crown of the hat from the forehead of the user, thereby forming a recess 10 between the sweat band and the forehead for the admission of air, which keeps the interior of the hat ventilated.

While I prefer in most instances to construct the device with an eyelet or sleeve 5 having suitable means for closing the bore of said sleeve, the sleeve may be entirely dispensed with if desired, and other means having similar capabilities used for closing the opening leading into the interior of the stud.

Having thus described my invention, what I claim as new and desire to secure by Letters Patent is:

1. A hat stud having a flange, a hollow shank connected therewith, and a flexible body connected with said shank.

2. A pneumatic hat stud having a hollow body, a shank and a flange formed integrally with each other.

3. A hat stud of yielding material having a hollow shank, a flange, and a flexible hollow body formed integrally with each other, a sleeve held in said shank, and means for closing the aperture of said sleeve.

4. A hat stud of yielding material having a shank and a flange formed integrally therewith, a sleeve held in said shank and provided with flaring ends, and means for closing the aperture of said sleeve.

5. A hat stud comprising a yielding hollow body, a shank, and a flange formed integrally therewith, and means for closing the aperture of said shank.

In testimony whereof I have signed my name to this specification in the presence of two subscribing witnesses.

HENRY W. SPEIGHT.

Witnesses:
　H. F. FALVEY,
　T. F. GUERIN.